US012785308B2

(12) United States Patent
Chen et al.

(10) Patent No.: US 12,785,308 B2
(45) Date of Patent: Nov. 3, 2026

(54) EXPANSION CARD AUXILIARY POWER CABLE ASSEMBLY WITH INTEGRATED E-FUSES

(71) Applicant: HEWLETT PACKARD ENTERPRISE DEVELOPMENT LP, Spring, TX (US)

(72) Inventors: Kuan-Wei Chen, Taipei City (TW); Chih-Wei Chiang, Taoyuan City (TW); Chao-Ming Chang, Taoyuan City (TW)

(73) Assignee: Hewlett Packard Enterprise Development LP, Spring, TX (US)

(*) Notice: Subject to any disclaimer, the term of this patent is extended or adjusted under 35 U.S.C. 154(b) by 421 days.

(21) Appl. No.: 18/647,539

(22) Filed: Apr. 26, 2024

(65) Prior Publication Data

US 2025/0337181 A1 Oct. 30, 2025

(51) Int. Cl.

*H01R 12/72* (2011.01)
*H01R 12/71* (2011.01)
*H01R 13/514* (2006.01)

(52) U.S. Cl.

CPC ......... *H01R 12/724* (2013.01); *H01R 12/716* (2013.01); *H01R 13/514* (2013.01)

(58) Field of Classification Search

CPC .. H01R 12/724; H01R 12/716; H01R 13/514; H01R 13/68; H01R 13/658; H01R 31/065; H01R 2201/06; H01R 13/02; H01R 27/00; H01R 43/00; G06F 1/189; G06F 1/26; G06F 1/183; H05K 7/1492

See application file for complete search history.

(56) References Cited

U.S. PATENT DOCUMENTS 6,261,104 B1 * 7/2001 Leman .................... G06F 1/184 439/752
9,287,688 B2 3/2016 Ewing et al.
11,150,705 B1 * 10/2021 Hsieh ...................... G06F 1/184
2008/0077726 A1 * 3/2008 Gilbert ...................... G06F 1/26 710/316
2009/0237895 A1 9/2009 Cole et al.
2013/0050970 A1 * 2/2013 Chen ...................... G06F 1/185 361/786

(Continued)

FOREIGN PATENT DOCUMENTS

CN 115864081 A * 3/2023
CN 120064723 A * 5/2025 ......... G06F 13/4022
KR 200347439 Y1 * 4/2004 ............... G06F 1/26

*Primary Examiner* — Travis S Chambers
(74) *Attorney, Agent, or Firm* — Jones Burke, PLLC

(57) ABSTRACT

An auxiliary power cable assembly comprises a paddle board, a power connector mounted to the paddle board, a riser output connector, a riser cable extending from paddle board to the riser output connector, an auxiliary output connector, and an auxiliary cable extending from the paddle board to the auxiliary output connector. The power connector is to connect to a power output connector of a primary system board of a computing system, the riser output connector is to connect to a riser card, and the auxiliary output connector is to connect to an expansion card. The paddle board comprises e-fuses configured to control electrical power supplied from the power connector to the riser output connector and from the power connector to the auxiliary output connector.

20 Claims, 6 Drawing Sheets

(56) References Cited

U.S. PATENT DOCUMENTS

| | | | | |
|---|---|---|---|---|
| 2022/0229798 | A1 | 7/2022 | Lambert et al. | |
| 2024/0204433 | A1* | 6/2024 | Chen | H01R 12/721 |
| 2025/0331118 | A1* | 10/2025 | Chen | G06F 1/183 |
| 2026/0089842 | A1* | 3/2026 | Sawyer | H05K 1/117 |

* cited by examiner

EXPANSION CARD AUXILIARY POWER CABLE ASSEMBLY WITH INTEGRATED E-FUSES

INTRODUCTION

Computing devices, such as servers, generally have a primary system board (e.g., motherboard) which comprises a variety of components, such as one or more CPU sockets, etc. In addition to these core components, the primary system board may also include electrical connectors to allow for the connection of electronic modules to the system board to expand the capability or functionality of the computing device. These connectors and the modules they receive are commonly referred to as expansion slots and expansion cards, respectively. Examples of such expansion slots include PCIe slots, M.2 connectors, and so on. Examples of common types of expansion cards include video cards or graphic processing units (GPUs), networking interface cards (NICs), storage controllers, hardware accelerators, and so on.

However, in some computing devices, it may not be possible to directly connect the expansion card to the expansion slot, for example, due to space constraints. Thus, an intermediate board, called a riser card, may be used to facilitate connection of the expansion card to the system board. The expansion card may be connected to the riser card and the riser card may be connected in turn to the expansion slot of the primary system board. The riser card is a printed circuit assembly (PCA) which carries an electrical connector that is suitable for receiving the expansion card and another electrical connector suitable for being connected to the expansion slot of the primary system board, and these connectors are arranged such that, when everything is connected, the expansion card fits as desired within the space constraints of the system. To physically support and secure the riser card and expansion card, a supporting structure referred to as a riser cage may be attached to the riser card and expansion card and anchored to the chassis of the computing device.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operations. In the drawings.

DETAILED DESCRIPTION

Figure 1:
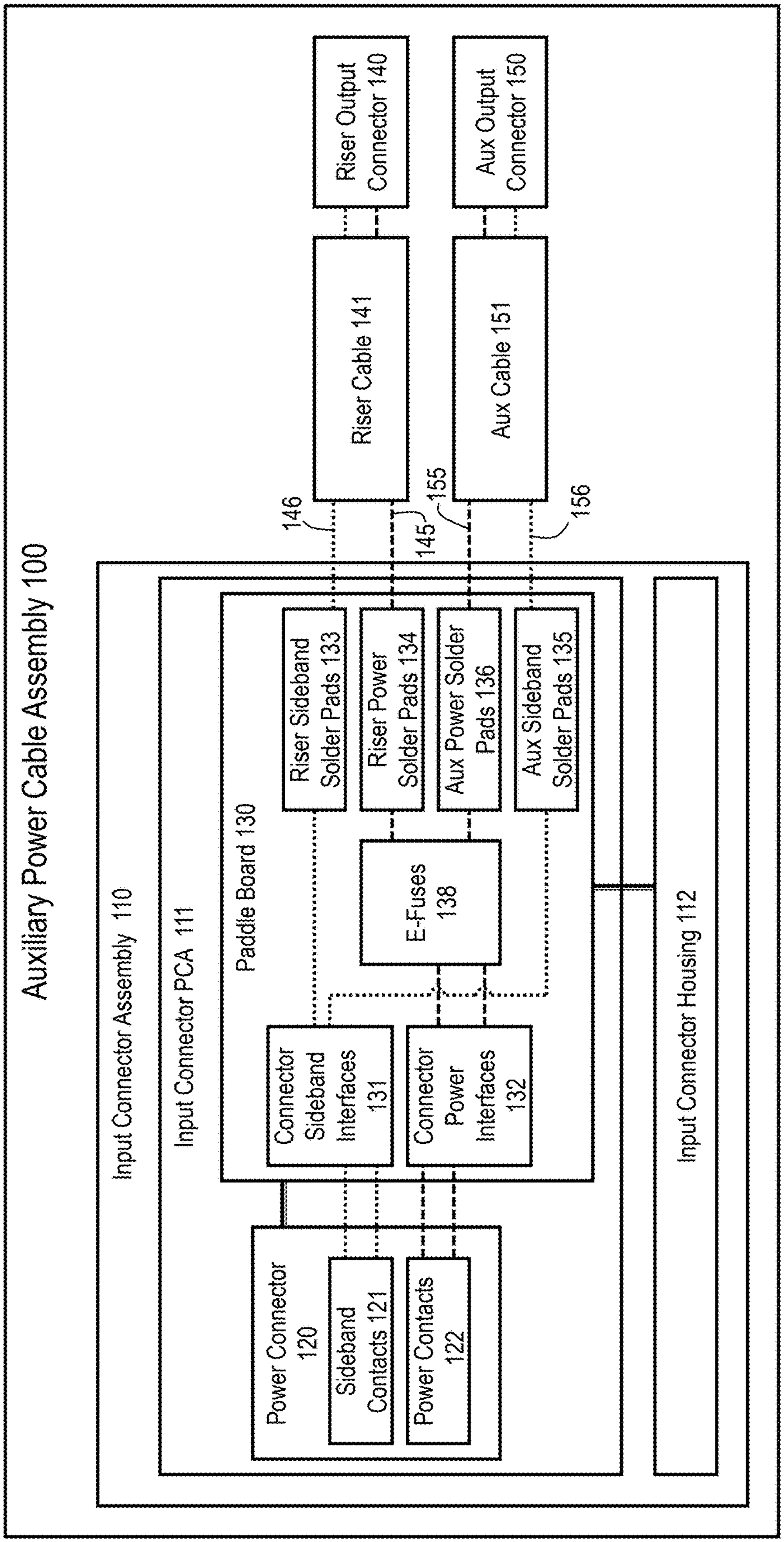
FIG. 1 is a block diagram illustrating an example auxiliary power cable assembly.

When an expansion card or other electronic module is connected to a primary system board, they generally draw electrical power from the system board. For example, if an expansion card is connected by a riser card to the system board, the expansion card may draw power from the riser card which in turn draws power from the expansion slot of the system board. In some cases, it may be desirable to provide power gating logic between the system board and the expansion card to control the flow of power thereto and to ensure safe operation. In particular, in systems which comply with the Open Compute Project (OCP) Platform Infrastructure Connectivity (M-PIC) Base Specification, this is not only desirable but mandatory. The OCP M-PIC Base Specification requires that any 12V peripheral subsystem, which includes many expansion cards and associated riser cards, have power gating logic disposed between the system board and the load.

One way to provide such power gating logic would be to add the power gating logic to the riser card. However, in some cases, it may be difficult and costly to provide such power gating logic on the riser card. Riser cards are often highly space constrained, and in some circumstances, there may not be sufficient free space in a riser card to accommodate the needed power gating logic. Furthermore, the addition of the power gating logic to the riser card may entail adding more copper to the riser card for routing the power signals, which also takes up more space and can increase the cost of the riser card (in addition to the cost of the power gating logic itself).

These difficulties may be magnified in riser cards which are designed to handle high amounts of electrical power, as greater amounts of electrical power may require more robust power gating logic, which costs more and takes up more space on the card, and more copper in the riser card for routing the power signals, which also costs more and takes up more space on the card. High power requirements are not uncommon in riser cards, as some expansion cards (such as graphics processing units (GPUs) may be rated to draw up to 600 W of sustained power, and the riser card to which such an expansion card is connected may need to be designed to handle even more power than this, for example to account for temporary excursions above the rated sustained power draw and/or to provide a safety margin. For example, to comply with the Peripheral Component Interconnect Special Interest Group (PCI-SIG) card electromechanical (CEM) specification (which covers riser cards having a PCI-SIG CEM connector, which is a type of PCIe connector), riser cards are required to be capable of handling temporary power draws of up to three-times the rated sustained power of the expansion card. Accordingly, in order to add power gating logic to certain riser cards, the power gating logic may need to capable of handling up to 1800 W per expansion card in some cases, which may require very robust power gating logic and correspondingly robust copper traces in the riser card. In many cases, this is not feasible due to riser card cost constraints and space constraints.

To address these and other issues, examples disclosed herein provide an auxiliary power cable assembly which can supply electrical power from a system board of a computing device to an expansion card, with the cable assembly including a number of e-fuses integrated therein to act as power gating logic to control the power supply to the expansion card. Because power can be supplied to the expansion card via the cable assembly, the expansion card does not need to draw power through the riser card (or can draw substantially less power through the riser card), and therefore the riser card does not need to be designed to handle large amounts of power. In particular, because the cable assembly includes the e-fuses to act as power gating logic, the system may satisfy power gating requirements, such as those imposed by the OCP M-PIC Base Specification, without having to add power gating logic to the riser card (or at the least the amount of power gating logic added to the riser card may be reduced). Thus, the difficulties related to finding space for power gating logic in the highly space constrained riser cards can be avoided and the costs of the riser cards can be substantially reduced. Moreover, the cable assembly is not as space constrained as most riser cards are, and therefore it can be less expensive and easier to include the power gating logic in the cable assembly than it would be to include the same power gating logic in the riser card. Thus, the example auxiliary power cable assemblies disclosed herein can meet desired power delivery specifications while also being less expensive and easier to produce.

In some examples, the auxiliary power cable assembly has an input connector assembly at one end thereof which is configured to connect to a power-output connector of the system board of the computing device (e.g., a PICPWR connector). At the other end of the cable assembly, there are one or more output connectors configured to connect to auxiliary power input connectors of an expansion card and/or a riser card. One or more cables extend between the input power connector assembly and the one or more output power connectors. The input connector assembly comprises a printed circuit assembly (PCA) comprising a paddle board and a power connector (e.g., PICPWR connector) mounted to the paddle board. In addition, the e-fuses are mounted to the paddle board. The e-fuses are connected between the power connector and the conductors of the cables, which are electrically coupled to the paddle board (e.g., via soldering to contacts on the paddle board). In some examples, the e-fuses on the paddle board provide power gating not only for the power delivered to the expansion card via one of the output connectors, but also for power delivered to the riser card via another of the output connectors.

In some examples, the auxiliary power cable assembly may be provided as an optional kit which a user may add to their system to allow it to use higher power expansion cards. Moreover, in some examples, the use of this optional kit may allow for the same riser card to be used in many different system configurations, including system configurations which have lower powered expansion cards and higher powered expansion cards. For example, in a system with a low-powered expansion card the riser card may be used without the cable assembly, as the riser card may be able to provide enough power on its own for the expansion card. However, in a system with a higher-powered expansion card, the same riser card may be used, even though it cannot provide enough power, and the auxiliary power cable assembly may be added to make up the difference in power supply. Enabling the same riser card to be used among multiple system configurations can save engineering, production, and logistical costs, as designing, producing, and handling multiple separate riser card designs can be costly. In addition, the optional auxiliary power cable assembly can allow users to more easily upgrade their systems after manufacture by adding the cable assembly without having to detach the existing riser card and replace it with a new one.

These and other aspects of examples disclosed herein will be described in greater detail below in relation to FIGS. 1-8.

Figure 2:
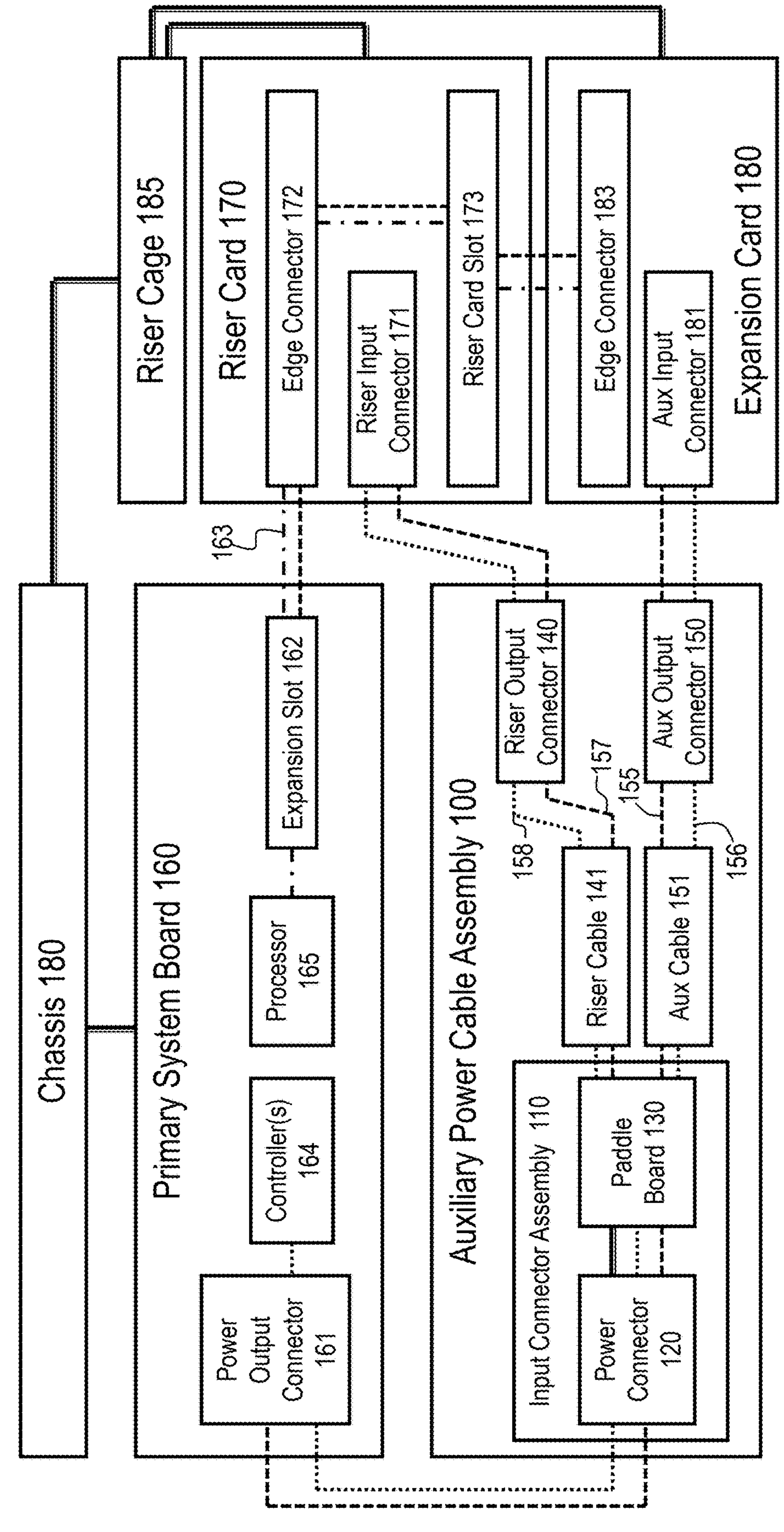
FIG. 2 is a block diagram illustrating an example computing system comprising the auxiliary power cable assembly of FIG. 1.

FIG. 1 illustrates an example auxiliary power cable assembly 100 (cable assembly 100). FIG. 2 illustrates an example computing device 101 comprising the auxiliary power cable assembly 100. FIGS. 1 and 2 are schematic in nature and are not intended to illustrate shapes, sizes, positions, or other structural details accurately or to scale. In particular, the nesting of blocks in FIGS. 1 and 2 indicates hierarchical (i.e., component/subcomponent) relationships rather than spatial/positional relationships, unless otherwise noted. Some examples of the cable assembly 100 or computing device 101 may include components which are not illustrated in FIG. 1 or 2, and one or more components illustrated in FIGS. 1 and 2 may be omitted in some examples. In FIGS. 1 and 2, physical connections between components are indicated schematically by double solid lines; electrical connections for conveying electrical power are indicated by dashed lines; and electrical connections for conveying sideband signals are indicated by dotted lines.

As shown in FIG. 1, the auxiliary power cable assembly 100 comprises an input connector assembly 110 at one end thereof, an auxiliary output connector 150 at the other end thereof, and an auxiliary cable 151 extending between and electrically connected to the input connector assembly 110 and the auxiliary output connector 150. In some examples, the cable assembly 100 may also include a riser output connector 140 and a riser cable 141 (in addition to auxiliary output connector 150 and auxiliary cable 151), with riser cable 141 extending between and electrically connected to the input connector assembly 110 and the riser output connector 140. In still other examples, the auxiliary power cable assembly 100 may include any number of additional output connectors and corresponding cables. These components will be described in turn below.

The input connector assembly 110 comprises an input connector printed circuit assembly (PCA) 111 (PCA 111). In some examples, the input connector assembly 110 also comprises an input connector housing 112 which is attached to and houses (e.g., at least partially encloses) the PCA 111. The PCA 111 comprises a printed circuit board (PCB) referred to herein as a paddle board 130 and a power connector 120 mounted to the paddle board 130.

The power connector 120 is configured to mate with a complementary power output connector 161 of a primary system board 160 of the computing device 101, as shown in FIG. 2. For example, the power connector 120 and power output connector 161 may be complementary PICPWR connectors as specified by the OCP M-PIC specification—e.g., the connector 161 may be a PICPWR socket (or header) and the connector 120 may be a PICPWR plug.

The power connector 120 comprises power contacts 122 which are electrical contacts configured to electrically connect with complementary power contacts of the power output connector 161 when the two connectors 120/161 are mated and to carry electrical power signals. The power contacts 122 may be pins, sockets, contact pads, spring fingers, or any other form of electrical termination or contact. Any number of power contacts 122 may be present. The power contacts 122 include supply contacts (also called the hot or positive contacts) which carry the supply potential and ground contacts (also called the neutral or return contacts) which carry the ground potential. In some examples, the electrical power supply signals are 12V DC power signals (i.e., the voltage difference between the supply potential and the ground potential is 12V), and in some examples, the power contacts 122 are rated to carry up to 10 A (120 W) per contact. In some examples, each power contact 122 is associated with a corresponding power pathway 145 or 155 through the auxiliary power cable assembly 110, with each power pathway 145 or 155 having a corresponding conductor (wire) in one of the cables 141 and/or 151 and a corresponding output power contact in one of the output connectors 140 and/or 150. The power pathways 155 traverse the auxiliary cable 151 and auxiliary output connector 150, destined for the expansion card 180, and are also referred to herein as expansion card power pathways 155. The power pathways 145 traverse the riser cable 141 and riser output connector 140, destined for the riser card 170, and are also referred to herein as riser card power pathways 145. In some implementations, ten of the power contacts 122 (five carrying the supply potential, five carrying the ground potential) are associated with expansion card power pathways 155, and two of the power contacts 122 (one supply, one ground) are associated with riser card power pathways 145.

The power connector 120 also comprises sideband contacts 121 which are electrical contacts configured to electrically connect with complementary sideband contacts of the power output connector 161 when the two connectors 120/161 are mated and to carry sideband signals. Sideband signals are communication signals associated with managing a peripheral subsystem, such as presence signals, status signals, etc. Any number of sideband contacts 121 may be present. In some examples, sideband contacts 121 are associated with corresponding sideband pathways 146 or 156 through the auxiliary power cable assembly 110, with each sideband pathway 146 or 156 having a corresponding conductor (wire) in one of the cables 141 and/or 151 and a corresponding output sideband contact in one of the output connectors. The sideband pathways 156 traverse the auxiliary cable 151 and auxiliary output connector 150, destined for the expansion card 180, and are also referred to herein as expansion card sideband pathways 156. The sideband pathways 146 traverse the riser cable 141 and riser output connector 140, destined for the riser card 170, and are also referred to herein as riser card sideband pathways 146. In some implementations, there may be two expansion card sideband pathways 156 and four riser card sideband pathways 146.

In some examples, connector 120 may include additional contacts which, although present in the power connector 120, are not connected to any of the power or sideband pathways through the cable assembly 100. For example, the connector 120 may include additional sideband contacts which are not connected to any sideband pathways through the assembly 100. References herein to the power or sideband contacts 121 and 122 should be understood as referring only to those contacts of the connector 120 which are connected to corresponding pathways through the cable assembly 110.

The power connector 120 may be physically attached and electrically connected to the paddle board 130. In particular, the paddle board 130 may include connector sideband interfaces 131, which are electrically connected to the sideband contacts 121 of the power connector 120, and connector power interfaces 132, which are electrically connected to the power contacts 122 of the power connector 120. In some examples, the connector 120 is surface mounted to the paddle board 130, in which case the interfaces 131 and 132 may include contact pads which contact (and may be soldered to) corresponding pins, contact pads, solder balls, or the like of the power connector 120, which are in turn electrically connected to the contacts 121 and 122 of the connector 120. In other examples, the connector 120 is through-hole mounted to the paddle board 130, in which case the interfaces 131 and 132 may include plated through-holes which receive (and may be soldered to) corresponding leads/pins of the power connector 120, which are in turn electrically connected to the contacts 121 and 122 of the connector 120. As noted above, in some examples, not all contacts of the connector 120 are necessarily used, and unused contacts of the connector 120 need not be connected to the interfaces 131 or 132.

The paddle board 130 also comprises a number of solder pads which are electrically connected (directly or indirectly) to the interfaces 131 and 132 and also soldered to conductors (wires) of one or more cables. These solder pads include auxiliary power solder pads 136, which are connected to corresponding connector power interfaces 132 (via e-fuses 138, described below) and soldered to electrical conductors (wires) of the auxiliary cable 151. Thus, each auxiliary power solder pad 136 forms part of one of the aforementioned expansion card power pathways 155. The solder pads also include auxiliary sideband solder pads 135, which are connected to corresponding connector sideband interfaces 131 and soldered to electrical conductors (wires) of the auxiliary cable 151. Thus, each auxiliary sideband pad 135 forms part of one of the aforementioned expansion card sideband pathways 156. As noted above, in some examples, there are ten expansion card power pathways 155 and two expansion card sideband pathways 156, and thus in such examples there may be ten auxiliary power solder pads 136 and two auxiliary sideband pads 135.

In some examples in which the riser cable 141 and riser output connector 140 are also present, the solder pads of the paddle board 130 also include riser sideband solder pads 133 and riser power solder pads 134. The riser power solder pads 134 are connected to corresponding connector power interfaces 132 (via e-fuses 138, described below) and soldered to electrical conductors (wires) of the riser cable 141. Thus, each riser power solder pads 134 forms part of one of the aforementioned riser card power pathways 145. In these examples, the solder pads also include riser sideband solder pads 133, which are connected to corresponding connector sideband interfaces 131 and soldered to electrical conductors (wires) of the riser cable 141. Thus, each riser sideband pad 133 forms part of one of the aforementioned riser card sideband pathways 146. As noted above, in some examples, there are two riser card power pathways 145 and four riser card sideband pathways 146, and thus in such examples there may be two riser power solder pads 134 and four riser sideband pads 133.

In some examples, the power pathways 145 and 155 remain electrically isolated from one another throughout their traversal of the cable assembly 100. However, in other examples some of the power pathways 145 and 155 could be electrically joined together at one or more points in their respective paths. For example, in some implementations, the connector power interfaces 132 which carry the supply potential may all be electrically connected together, effectively forming a single supply power rail, and all of the connector power interfaces 132 which carry the ground potential may all be electrically connected together, effectively forming a single ground power rail. As another example, in some implementations, the auxiliary power solder pads 136 which carry the supply potential may all be electrically connected together, and the auxiliary power solder pads 136 which carry the ground potential may all be electrically connected together.

The paddle board 130 also comprises one or more e-fuses 138 mounted thereto and disposed in the aforementioned power supply pathways 155 and/or 145 to control the flow of power therethrough. An e-fuse 128 may comprise an integrated circuit which includes a power switch and a control circuit which controls the power switch. The power pathway connected to one of e-fuses 128 traverses the power switch of the e-fuse 128 so that the power switch controls the flow of power therethrough. The control circuit of the e-fuse 128 may monitor conditions of the power pathway (e.g., voltage and current) and control the power switch based therein—for example, the e-fuse may cut off or limit power flow if voltage or current thresholds are surpassed. The e-fuse 128 may be programmable to set thresholds and define behaviors.

As previously mentioned, the e-fuse(s) 128 are disposed in the power pathways 155 and 145. More specifically, each connector power interface 132 is connected to the input of an e-fuse 128 and each auxiliary power solder pads 136 and each riser power solder pads 134 is electrically connected to the output of an e-fuse 128. The connections between the e-fuse 128 the other components may comprise internal circuitry of the paddle board 130 (e.g., conductive traces). In some examples, at least each power pathway 155 or 145 which carries the supply potential has a corresponding e-fuse 128 to control the flow of power therethrough (this indirectly controls the flow of power through the ground carrying pathways, as current will only flow if there is a completed circuit). In some examples, at least each power pathway 155 or 145 which carries the ground potential has a corresponding e-fuse 128 to control the flow of current therethrough (this indirectly controls the flow of power through the supply carrying pathways). In some examples in which one or more power pathways 155 or 145 are joined together at one or more points, it may be possible for those joined power pathways 155 or 145 to share the same e-fuse 128. For example, supposing that auxiliary power solder pads 136 are electrically connected to one another, then a single e-fuse 138 could be provided for all of the expansion card power pathways 155. Note also that in some cases both a supply potential and a ground potential may be provided to an e-fuse 138 to allow it to operate, but in some cases the e-fuse 138 may directly control (switch) only one of the potentials.

As mentioned above, the input connector assembly 110 comprises a housing 112. In some examples, the housing 112 covers exposed electrical contacts of the paddle board 130, such as the solder pads 133, 134, 135, 136, to prevent inadvertent contact by a user or other object. The housing 112 may also protect components of the paddle board 130 from damage by external objects. In some examples, the housing 112 comprises a hollow box-like structure made from a rigid material (e.g., plastic), which partially encloses and houses the paddle board 130. In such examples, the portion of the power connector 120 which mates with the connector 161 may protrude from the housing 112 via an opening, and the cables 141 and 151 may also protrude into the housing 112 via an additional opening or openings. In other examples, the housing 112 may comprise a more flexible or malleable material, such as Mylar, which is wrapped around the paddle board 130, covering the exposed electrical contacts thereof. In other examples, the housing 112 may comprise a resin or similar material which is coated on the paddle board 130 in liquid form and then cured to a hardened form. In some examples in which resin (or similar material) is used as the housing 112, the resin may cover and encapsulate most or all of the paddle board 130, and may also cover portions of the power connector 120 and/or cables 141/151. In other examples in which resin (or similar material) is used, the resin may be disposed on exposed electrical contacts to prevent inadvertent contact therewith while leaving some other areas exposed.

Turning to the cables 141 and 151, each may comprise a number of conductors (wires), which are soldered to the pads 133, 134, 135 or 136 as described above. Each such conductor may be a single solid wire or a combination of multiple strands combined together into a stranded wire. The cables 141 and 151 may also include sheathing to protect the conductors and to bundle the conductors together, with the bundled cables being referred to as a cable. The riser cable 141 and auxiliary cable 151 may be separate throughout their entire lengths in some examples. In other examples, the riser cable 141 and auxiliary cable 151 may initially be joined together at a proximal end thereof (the end which is connected to the input connector assembly 110), and then they may later split into separate cables at the distal ends thereof.

The distal end of the axillary cable 151 is connected to an auxiliary output connector 150. The auxiliary output connector 150 is configured to be mated with an auxiliary input connector 181 of the expansion card 180, as shown in FIG. 2. The auxiliary input connector 181 is an auxiliary power connector of the expansion card 180 configured to receive input power and to communicate sideband signals. The auxiliary output connector 150 comprises various electrical contacts (e.g., pins) corresponding to the expansion card power pathways 155 described above and various electrical contacts corresponding to the expansion card sideband pathways 156 described above. These electrical contacts mate with corresponding contacts of the auxiliary input connector 181, thus electrically connecting the power pathways 155 and sideband pathways 156 to the expansion card 180. This allows the primary system board 160 to supply electrical power to the expansion card 180 through the auxiliary power cable assembly 100. In some examples, there are ten expansion card power pathways 157 (five supply and five ground) and two expansion card sideband pathways 158, and thus in such examples the auxiliary output connector 150 may comprise twelve electrical contacts.

In examples which include the riser cable 141, the distal end of the riser cable 141 is connected to a riser output connector 140. The riser output connector 140 is configured to be mated with a riser input connector 171 of the riser card 170, as shown in FIG. 2. The riser input connector 171 is an auxiliary power connector of the riser card 170 configured to receive input power and to communicate sideband signals. The riser output connector 140 comprises various electrical contacts (e.g., pins) corresponding to the riser card power pathways 157 described above and various electrical contacts corresponding to the riser card sideband pathways 158 described above. These electrical contacts mate with corresponding contacts of the riser input connector 171, thus electrically connecting the power pathways 157 and sideband pathways 158 to the riser card 170. This allows the primary system board 160 to supply electrical power to the riser card 170 through the auxiliary power cable assembly 100. In some examples, there are two riser card power pathways 157 (one supply and one ground) and four riser card sideband pathways 158, and thus in such examples the riser output connector 140 may comprise six electrical contacts.

Turning to FIG. 2, the computing system 101 comprises a chassis 180, a primary system board 160 supported by the chassis, a riser card 170, an expansion card 180, and the auxiliary power cable assembly 100.

The primary system board 160 may be a motherboard or, in systems which follow the OCP Data Center-Modular Hardware System (DC-MHS) specification, a host processor module (HPM). The primary system board 160 comprises a processor 165, an expansion slot 162, a power output connector 161, and one or more controllers 164. The expansion slot 162 is to receive an expansion card 180. The expansion slot 162 may include a PCIe slot. The power output connector 161 is configured to supply power to peripheral subsystems, and as described above may be a PICPWR connector in some examples.

The controllers 164 include logic to manage, among other things, the delivery of power to the expansion card 180 via the power output connector 161. In some examples, the sideband signals carried by the auxiliary power cable assembly 100 are communicated with the controllers 164. The controllers 164 may include, in some examples, a baseboard management controller (BMC). The controllers 164 may also include, in some examples, a Field Programable Gate Array (FPGA), Complex Programable Logic Device (CPLD), or other dedicated hardware, in addition to or in lieu of the BMC. Although controller 164 is illustrated as part of the primary system board 160, it should be understood that in some examples, all or part of the controller 164 (e.g., a BMC) may be provided as part of a separable module which is connected to the primary system board 160, such as part of a Datacenter Secure Control Module (DC-SCM).

In some examples, the riser card 170 comprises an edge connector 172, such as a PCIe edge connector in some examples. The edge connector 172 is mated with the expansion slot 162, in some examples. The riser card 170 also comprises a riser card slot 173, which is electrically connected to the edge connector 172. The riser card slot 173 may be similar in form to the expansion slot 162 (e.g., it may be a PCIe slot in some examples). The expansion card 180 comprises an edge connector 183 which is mated with the riser card slot 173. Thus, a primary data communication channel 163, indicated in FIG. 2 by dot-dashed lines, is formed between the primary system board 160 and the expansion card 180 via the expansion slot 162, edge connector 172, riser card slot 172, and edge connector 183. This primary data communication channel 163 may be, for example, a PCIe interface which comprises one or more PCIe lanes (e.g., 1× lanes, 4× lanes, 8× lanes, 16× lanes). It is over this channel 163 that most of the communication between primary system board 160 and expansion card 180 occurs, other than for sideband signals which are carried via the auxiliary power cable assembly 100.

In some examples, the system 101 comprises a riser cage 185 to which the riser card 170 and the expansion card 180 are attached. The riser cage 185 is a support structure which is attached to the chassis 180, and thus supports and secures the riser card 170 and expansion card 180 relative to the chassis.

As described above, the riser output connector 140 is connected to the riser input connector 171 of the riser card 170, and similarly the auxiliary output connector 150 is connected to the auxiliary input connector 1810 of the expansion card 180. This allows for power to be delivered from the system board 160 to the expansion card 180 and riser card 170 via the auxiliary power cable assembly. Moreover, because the power gating logic is provided in the cable assembly 100, in the form of e-fuses 138, less power gating logic, or in some cases no power gating logic, need be provided in the riser card 170.

In some examples, some electrical power may also be delivered from the expansion slot 162 to the riser card 170 and/or from the riser card slot 173 to the expansion card 180. However, because the auxiliary power cable assembly 100 is able to supply power to the expansion card 180, the amount of power supplied via the expansion slot 162 may be kept relatively small in some examples. This may allow less power gating to be used in the riser card 170. In other examples, the use of the auxiliary power cable assembly 100 may allow for no power to be supplied via the expansion slot 162 to either riser card 170 or expansion card 180 (i.e., all power to riser cared 170 and expansion card 180 is supplied by the cable assembly 100), in which case the riser card 170 can omit the power gating logic entirely.

Turning now to FIGS. 3-8, an example auxiliary power cable assembly 200 (cable assembly 200) will be described. The cable assembly 200 is one example implementation of the cable assembly 100 described above, and some components of the cable assembly 200 thus correspond to (i.e., are implementation examples of) components of the cable assembly 100. Such corresponding components are given similar reference numbers having the same last two digits, such as 120 and 220. In some cases, descriptions above of aspects of the cable assembly 100 apply also to the corresponding components of the cable assembly 200 described below, unless otherwise indicated or logically contradictory, and thus duplicative description of such aspects may be omitted below. Although the cable assembly 200 is one example implementation of the cable assembly 100, the cable assembly 100 is not limited to just the cable assembly 200. In addition, in FIGS. 5-8 the cable assembly 200 is illustrated in connection with various other components to provide context, such as primary system boards 260 and 360, riser card 270, and expansion card 280. The primary system boards 260 and 360 are example implementations of the primary system board 160 described above, the riser card 270 is an example implementation of riser card 170, and expansion card 280 is an example implementation of riser card 180.

Figure 3:
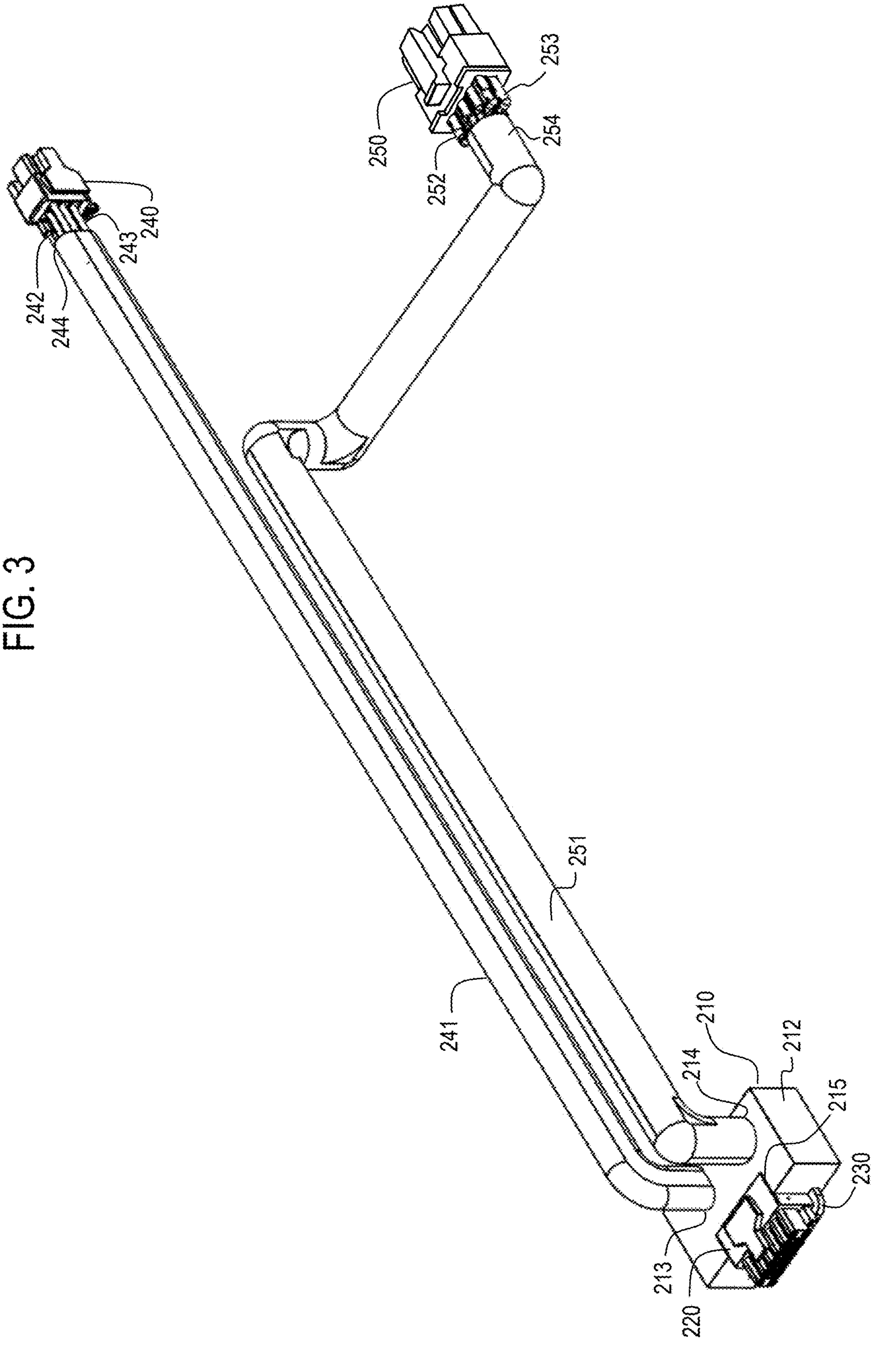
FIG. 3 is a perspective view of an example auxiliary power cable assembly.

As shown in FIG. 3, the auxiliary power cable assembly 200 comprises an input connector assembly 210 at one end thereof, an auxiliary output connector 250 at the other end thereof, an auxiliary cable 251 extending between and electrically connected to the input connector assembly 210 and the auxiliary output connector 250, a riser output connector 240, and a riser cable 241 extending between and electrically connected to the input connector assembly 210 and the riser output connector 240. These components will be described in turn below.

Figure 4:
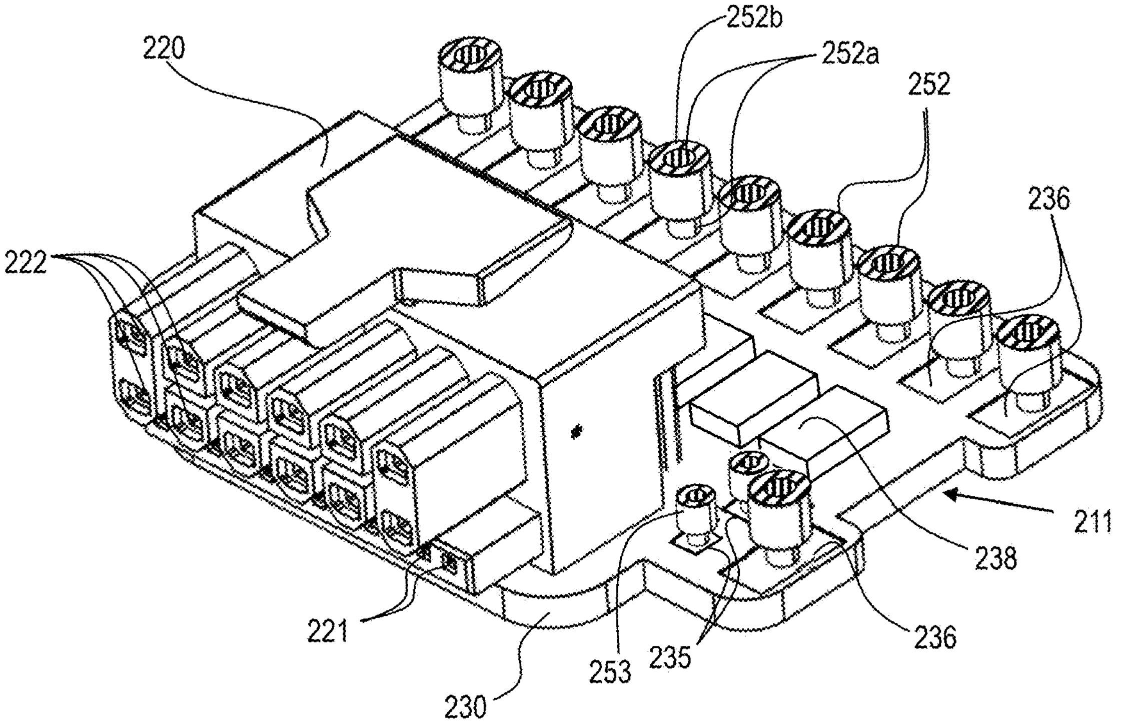
FIG. 4 is a perspective view of an input connector assembly of the auxiliary power cable assembly of FIG. 3 with a housing of the connector assembly omitted.
Figure 5:
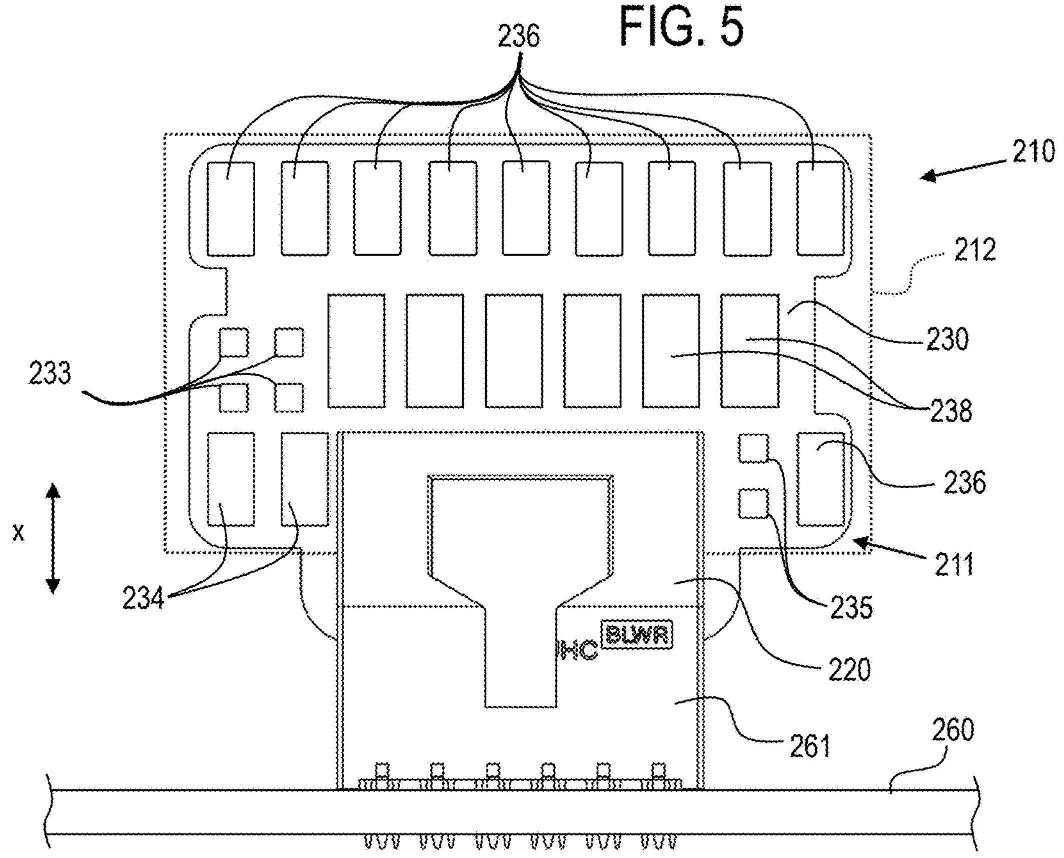
FIG. 5 is a front view of the input connector assembly of the auxiliary power cable assembly of FIG. 3 mated with a power output connector of a system board, with the housing of the connector assembly made transparent and indicated in dotted lines.

As shown in FIGS. 4 and 5, the input connector assembly 210 comprises an input connector printed circuit assembly (PCA) 211 (PCA 211) and an input connector housing 212 (shown in ghost/transparency) which is attached to and houses (e.g., at least partially encloses) the PCA 211. The PCA 211 comprises a printed circuit board (PCB) referred to herein as a paddle board 230 and a power connector 220 mounted to the paddle board 230.

Figure 6:
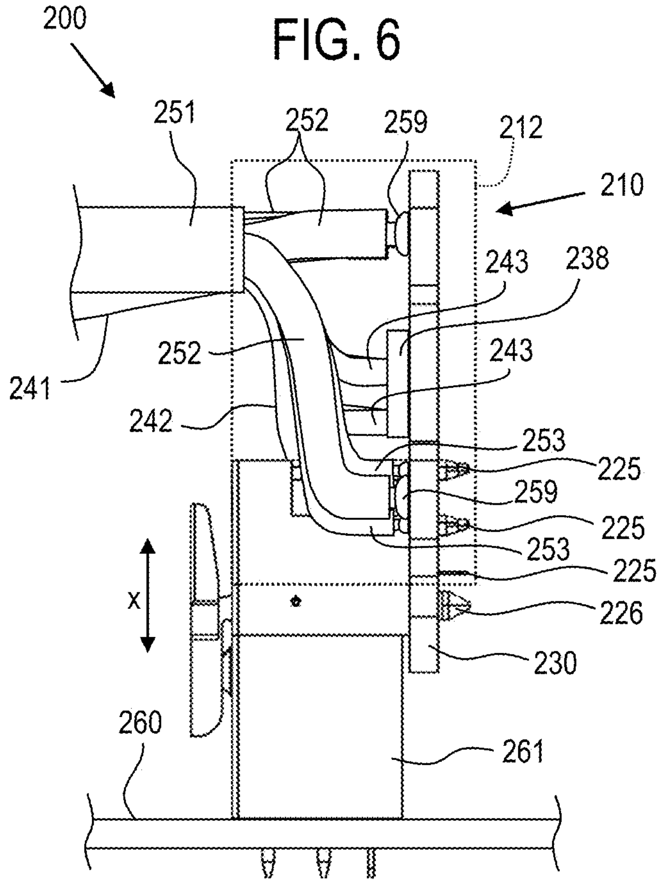
FIG. 6 is a side view of the input connector assembly of the auxiliary power cable assembly of FIG. 3 mated with the power output connector of the system board of FIG. 5, with the housing of the connector assembly made transparent and indicated in dotted lines.
Figure 7:
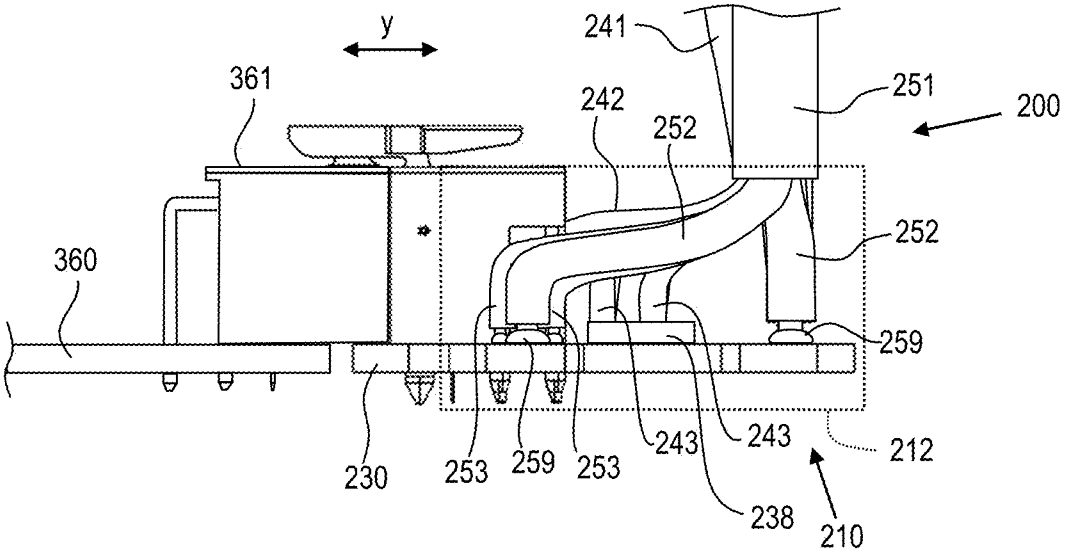
FIG. 7 is a side view of the input connector assembly of the auxiliary power cable assembly of FIG. 3 mated with a power output connector of another system board, with the housing of the connector assembly made transparent and indicated in dotted lines.

The power connector 220 is a PICPWR plug-type connector as defined by the OCP M-PIC Base Specification and is configured to mate with a complementary PICPWR socket-type power output connector of a primary system board of a computing device. For example, as shown in FIGS. 5 and 6, the power connector 220 can mate with a vertical PICPWR connector 261 (a vertical header) of the system board 260, with a mating axis "x" being perpendicular to the face of the system board 260 (the matting axis referring to the direction along which the connectors 220 and 261 are moved relative to on another to achieve mating). As another example, as shown in FIG. 7, the power connector 220 can mate with a right-angle PICPWR connector 361 (a right-angle header) of the system board 360, with a mating axis "y" being parallel to the face of the system board 360.

As shown FIGS. 4, the power connector 220 comprises twelve power contacts 222 (only four are labeled in FIG. 4 to avoid obscuring the figures) arranged in two rows. The top row of six power contacts 222 are supply contacts that carry the supply potential, which in this example is 12V. The bottom row of six power contacts 222 are ground contacts which carry the ground potential. Each of the power contacts 222 is rated to carry up to 10 A (120 W) per contact. Each power contact 222 is electrically connected to a corresponding power pathway through the auxiliary power cable assembly 210, which are described in greater detail below. In this example, ten of the power contacts 222 (five carrying the supply potential, five carrying the ground potential) are associated with expansion card power pathways which supply power to the expansion card, while two of the power contacts 222 (one supply, one ground) are associated with riser card power pathways which supply power to the riser card.

The power connector 220 also comprises sideband contacts 221 which are arranged in a third row beneath the power contacts 222. In some examples, twelve of the sideband contacts 221 are present (only two are labeled in FIG. 4 to avoid obscuring the figure), although not all of these are used to carry signals. In some examples, six of the sideband contacts 221 are electrically connected to corresponding sideband pathways which are used to carry sideband signals through the auxiliary power cable assembly 210. In this example, two of the sideband contacts 221 are associated with expansion card sideband pathways which communicate sideband signals with the expansion card, and four of the sideband contacts 221 are associated with riser card sideband pathways which communicate sideband signals with the riser card.

The power connector 220 is physically attached and electrically connected to the paddle board 230. In particular, the power connector 220 comprises stakes 226 which extend through the paddle board 230 to help secure power connector 220 to paddle board 230. In addition, the power connector 220 includes electrical leads 225 which extend through corresponding plated through-holes (not visible) in the paddle board 230 to electrically connect the power connector 220 to the paddle board 230. The plated through-holes which receive the electrical leads 225 are examples of the sideband and power interfaces 131 and 132 described above. The electrical leads 225 may be soldered to these through-holes.

As shown in FIG. 5, the paddle board 230 also comprises a number of solder pads 233, 234, 235, and 236, which are electrically connected (directly or indirectly) to the contacts 221 or 220 of the connector via the through-holes and the electrical leads 225 of the connector 220. These solder pads 233, 234, 235, and 236 are soldered to corresponding conductors (wires) 242, 243, 252, or 253 of the cables 241 or 251, as shown in FIGS. 4, 6 and 7. Note that, in FIG. 4, only the conductors 252 and 253 are visible, but some of the conductors 242 and 243 are visible in FIGS. 6 and 7 and the conductors 242 and 243 have similar structure as conductors 252 and 253, respectively. In addition, in FIG. 4 solder is not shown and the conductors 252 and 253 are shown as cut short to avoid obscuring other aspects (with cut surfaces being shown with hashing), but in practice all of the conductors 242, 243, 252, or 253 would extend out of the housing 212 and into the cable 241 or 251 as shown in FIGS. 6 and 7. Each conductor has a conductive portion surrounded by an insulator, such as the conductive portions 252*a* and insulators 252*b* which are illustrated in FIG. 4. The conductive portion 252*a* is brought into contact with one of the solder pads 236 as shown in FIG. 4 and then solder 259 is added to join the two together as shown in FIG. 6.

The power pathways mentioned above include expansion card power pathways which each comprise an auxiliary power conductor 252 extending through the auxiliary power cable 251 to the auxiliary output connector 250. More specifically, auxiliary power solder pads 236 are connected to power pins 222 (via e-fuses 238, described below) and soldered to auxiliary power conductors 252 of the auxiliary cable 251. Thus, each auxiliary power solder pad 236 forms part of a corresponding expansion card power pathway which supplies power to the expansion card. In this example, there are ten auxiliary power solder pads 236 and ten auxiliary power conductors 252 corresponding to ten expansion card power pathways, as shown in FIGS. 4 and 5.

The power pathways also include riser card power pathways which each comprise a riser power conductor 242 extending through the riser cable 241 to the riser output connector 242. The riser power solder pads 234 are connected to corresponding power contacts 222 (via e-fuses 238, described below) and are soldered to riser power conductors 242 of the riser cable 241. Thus, each riser power solder pad 234 forms part of a corresponding riser card power pathway which supplies power to the riser card. In this example, there are two riser power solder pads 234, as shown in FIG. 5, and two riser power conductors 242 corresponding to the two riser card power pathways.

The sideband pathways include expansion card sideband pathways which each comprise an auxiliary sideband conductor 253 extending through the auxiliary power cable 251 to the auxiliary output connector 250. Auxiliary sideband solder pads 235 are connected to sideband contacts 221 and are soldered to auxiliary sideband electrical conductors 253 of the auxiliary cable 251. Thus, each auxiliary sideband pad 235 forms part of a corresponding expansion card sideband pathway 256 which communicates sideband signals with the expansion card. In this example, there are two auxiliary sideband pads 235 and two auxiliary sideband electrical conductors 253 corresponding to two expansion card sideband pathways 256, as shown in FIGS. 4 and 5.

The sideband pathways also include riser card sideband pathways which each comprise a riser sideband conductor 243 extending through the riser cable 241 to the riser output connector 242. The riser sideband solder pads 233 are connected to corresponding sideband contacts 221 of the connector 220 and are soldered to riser sideband conductors 243 of the riser cable 241. Thus, each riser sideband pad 233 forms part of a corresponding riser card sideband pathway. In this examples, there are four riser sideband pads 233, as shown in FIG. 5, and four riser sideband conductors 243 corresponding to four riser card sideband pathways as shown in FIG. 5.

In this example, the paddle board 230 comprises six e-fuses 238 mounted thereto and disposed in the aforementioned power supply pathways 255 and/or 245 to control the flow of power therethrough. The e-fuses 238 are connected to and configured to control each power pathway that carries the supply potential, and thus also indirectly controls the power through the ground carrying power pathways as well. More specifically, each power contact 222 which carries the supply potential is electrically connected (via a lead 225 and the through-hole in which the lead 225 is disposed) to an input of a corresponding e-fuse 228. Moreover, each auxiliary power solder pads 236 that is to carry the supply potential is electrically connected to the output of a corresponding e-fuse 228. Similarly, each riser power solder pads 234 that is to carry the supply potential is electrically connected to the output of a corresponding e-fuse 228. In other examples, the e-fuses 238 are connected to and configured to control each power pathway that carries the ground potential, and thus also indirectly controls the power through the supply carrying power pathways as well. The e-fuses 238 comprise integrated circuits which are commercially available and which may be mounted (e.g., surface mounted, through hole mounted, etc.) to the paddle board 230.

As mentioned above, the input connector assembly 210 comprises a housing 212. In this example, the housing 212 comprises a rigid hollow box-like structure which partially encloses and houses the paddle board 230. The housing 212 may be an electrically insulating (dielectric) material, such as plastic. The housing 212 covers all exposed metal portions of the assembly 210 which are electrified other than the contacts 220/221 of the connector 220, such as leads 225, the solder pads 233, 234, 235, 236, and the ends of the conductors of the cables 241 and 251. As shown in FIG. 3, the mating portion of the power connector 220 protrudes from the housing 212 via an opening 214, and the cables 241 and 251 also protrude into the housing 212 via openings 213 and 213.

Turning to the cables 241 and 251, each may comprise a number of conductors (wires) 242, 243, 252, and 253, which are soldered to the pads 233, 234, 235 or 236 as described above. Each such conductor 242, 243, 252, and 253 may be a single solid wire or a combination of multiple strands combined together into a stranded wire. The cables 241 and 251 may also include sheathing 254 and 244 to protect the conductors 242, 243, 252, and 253 and to bundle the conductors together. In this example, the riser cable 241 comprises two riser power conductors 242 and four riser sideband conductors 243, while the auxiliary cable 251 comprises ten auxiliary power conductors 252 and two auxiliary sideband conductors 253.

Figure 8:
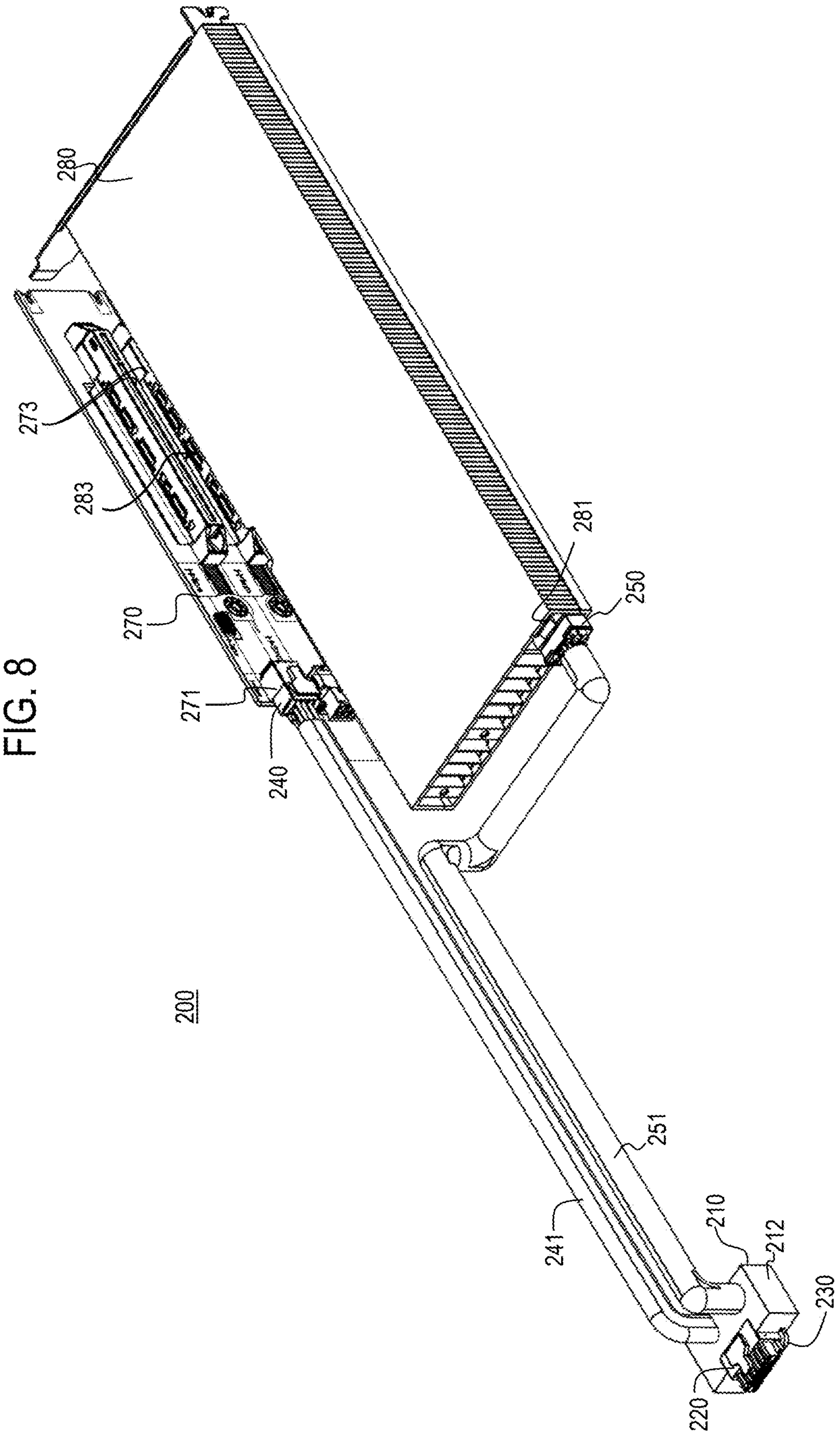
FIG. 8 is a perspective view of the auxiliary power cable assembly of FIG. 3 connected to a riser card and an expansion card.

The distal end of the axillary cable 251 is connected to an auxiliary output connector 250. The auxiliary output connector 250 is configured to be mated with an auxiliary input connector 281 of the expansion card 280, as shown in FIG. 8. The auxiliary input connector 281 is an auxiliary power connector of the expansion card 280 configured to receive input power and to communicate sideband signals. In this example, the auxiliary output connector 250 comprises various ten electrical contacts (e.g., pins) connected to the auxiliary power conductors 252 and corresponding to the expansion card power pathways described above. The auxiliary output connectors 250 also comprises two electrical contacts connected to the auxiliary sideband conductors 253 corresponding to the expansion card sideband pathways described above. These electrical contacts mate with corresponding contacts of the auxiliary input connector 281, thus electrically connecting the power pathways and sideband pathways to the expansion card 280. This allows a primary system board to supply electrical power to the expansion card 280 through the auxiliary power cable assembly 200 and to exchange sideband signals therewith to manage the supply of power the expansion card 280.

Similarly, the distal end of the riser cable 241 is connected to a riser output connector 240. The riser output connector 240 is configured to be mated with a riser input connector 271 of the riser card 270, as shown in FIG. 8. The riser input connector 271 is an auxiliary power connector of the riser card 270 configured to receive input power and to communicate sideband signals. The riser output connector 240 comprises two electrical contacts (e.g., pins) connected to riser power conductors 242 and corresponding to the riser card power pathways described above. The riser output connector 240 also comprises four electrical contacts connected to the riser sideband conductors 243 and corresponding to the riser card sideband pathways described above. These electrical contacts mate with corresponding contacts of the riser input connector 271, thus electrically connecting the power pathways and sideband pathways to the riser card 270. This allows a primary system board to supply electrical power to the riser card 270 through the auxiliary power cable assembly 200 and to exchange sideband signals therewith to manage the supply of power to the riser card 270 and/or to the expansion card 280 coupled to the riser card 270. (As shown in FIG. 7 the riser card 270 also comprises a number of riser card slots 273 and the expansion card 280 comprises an edge connector 283 which is connected to one of the riser card slots 273).

As noted above, in some examples, the cable assembly 200 can be connected to a vertical PICPWR connector 261 of a system board 260. As shown in FIG. 6, in this configuration, the cables 241 and 251 exit the housing 212 extending horizontally (parallel to the system board 261), or in other words at a right-angle to the mating axis x of the connectors 220/261. Consequently, the overall height of the assembly in the x-axis direction can be reduced, as compared to if the cables 241 and 251 exited the housing through a rear side thereof parallel to the mating axis x. This can allow the cable assembly 200 to be successfully used in systems which have very little vertical space, such as in 1U servers. For example, in some implementations, the overall vertical height of the connector 220 above the system board 260 when coupled to the connector 261 is only 35 mm.

As noted above, in some examples, the cable assembly 200 can be connected to a right-angle PICPWR connector 361 of a system board 360. As shown in FIG. 7, in this configuration, the cables 241 and 251 exit the housing 212 extending vertically (perpendicular to the system board 326), or in other parralel to the mating axis y of the connectors 220/361. In addition, in this configuration, the paddle board 230 is parallel to, and coplanar with, the system board 361.

In the description above, various types of electronic circuitry are described. As used herein, “electronic” is intended to be understood broadly to include all types of circuitry utilizing electricity, including digital and analog circuitry, direct current (DC) and alternating current (AC) circuitry, and circuitry for converting electricity into another form of energy and circuitry for using electricity to perform other functions. In other words, as used herein there is no distinction between “electronic” circuitry and “electrical” circuitry.

It is to be understood that both the general description and the detailed description provide examples that are explanatory in nature and are intended to provide an understanding of the present disclosure without limiting the scope of the present disclosure. Various mechanical, compositional, structural, electronic, and operational changes may be made without departing from the scope of this description and the claims. In some instances, well-known circuits, structures, and techniques have not been shown or described in detail in order not to obscure the examples. Like numbers in two or more figures represent the same or similar elements.

In addition, the singular forms “a”, “an”, and “the” are intended to include the plural forms as well, unless the context indicates otherwise. Moreover, the terms “comprises”, “comprising”, “includes”, and the like specify the presence of stated features, steps, operations, elements, and/or components but do not preclude the presence or addition of one or more other features, steps, operations, elements, components, and/or groups. Components described as coupled may be electronically or mechanically directly coupled, or they may be indirectly coupled via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

And/or: Occasionally the phrase “and/or” is used herein in conjunction with a list of items. This phrase means that any combination of items in the list—from a single item to all of the items and any permutation in between—may be included. Thus, for example, “A, B, and/or C” means “one of {A}, {B}, {C}, {A, B}, {A, C}, {C, B}, and {A, C, B}”.

Elements and their associated aspects that are described in detail with reference to one example may, whenever practical, be included in other examples in which they are not specifically shown or described. For example, if an element is described in detail with reference to one example and is not described with reference to a second example, the element may nevertheless be claimed as included in the second example.

Unless otherwise noted herein or implied by the context, when terms of approximation such as “substantially,” “approximately,” “about,” “around,” “roughly,” and the like, are used, this should be understood as meaning that mathematical exactitude is not required and that instead a range of variation is being referred to that includes but is not strictly limited to the stated value, property, or relationship. In particular, in addition to any ranges explicitly stated herein (if any), the range of variation implied by the usage of such a term of approximation includes at least any inconsequential variations and also those variations that are typical in the relevant art for the type of item in question due to manufacturing or other tolerances. In any case, the range of variation may include at least values that are within ±1% of the stated value, property, or relationship unless indicated otherwise.

Further modifications and alternative examples will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various examples shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present teachings and following claims.

It is to be understood that the particular examples set forth herein are non-limiting, and modifications to structure, dimensions, materials, and methodologies may be made without departing from the scope of the present teachings.

Other examples in accordance with the present disclosure will be apparent to those skilled in the art from consideration of the specification and practice of the invention disclosed herein. It is intended that the specification and examples be considered as exemplary only, with the following claims being entitled to their fullest breadth, including equivalents, under the applicable law.

What is claimed is:

1. An auxiliary power cable assembly, comprising:

an input connector assembly comprising a paddle board and a power connector mounted to the paddle board, the power connector configured to connect to a power output connector of a primary system board of a computing system;

a riser output connector configured to connect to a riser power input of a riser card;

a riser cable connected to the paddle board to the riser output connector;

an auxiliary output connector configured to connect to an auxiliary power input of an expansion card coupled to the riser card; and an auxiliary cable connected to the paddle board to the auxiliary output connector;

wherein the paddle board comprises e-fuses configured to control electrical power supplied from the power connector to the riser output connector and from the power connector to the auxiliary output connector.

2. The auxiliary power cable assembly of claim 1, comprising:

riser power pathways configured to convey power from the power connector to the riser card via the riser cable and riser output connector;

riser sideband pathways configured to convey sideband signals between the power connector and the riser card via the riser cable and riser output connector;

auxiliary power pathways configured to convey power from the power connector to the expansion card via the auxiliary cable and auxiliary output connector; and auxiliary sideband pathways configured to convey sideband signals between the power connector and the expansion card via the auxiliary cable and auxiliary output connector.

3. The auxiliary power cable assembly of claim 2, wherein the power connector comprises power contacts and sideband contacts;

wherein some of the power contacts correspond to the riser power pathways and some of the power contacts correspond to the auxiliary power pathways; and wherein some of the sideband contacts correspond to the riser sideband pathways and some of the sideband contacts correspond to the sideband power pathways.

4. The auxiliary power cable assembly of claim 2, wherein the power connector comprises twelve power contacts and six sideband contacts; wherein two of the power contacts correspond to the riser power pathways and ten of the power contacts correspond to the auxiliary power pathways; and wherein four of the sideband contacts corresponding to the riser sideband pathways and two of the sideband contacts correspond to the sideband power pathways.

5. The auxiliary power cable assembly of claim 4, wherein the paddle board comprises six of the e-fuses, with one of the e-fuses being configured to control power through the first power pathways and five of the e-fuses being configured to control power through the auxiliary power pathways.

6. The auxiliary power cable assembly of claim 1, wherein the power connector comprises a first subset of power contacts configured to carry a supply potential and a second subset of power contacts configured to carry a ground potential; wherein the paddle board comprises one of the e-fuses for each power contact in the first subset of power contacts, with each power contact in the first subset of power contacts being electrically connected to an input of the e-fuse.

7. The auxiliary power cable assembly of claim 6, wherein respective output of one or more of the e-fuses are connected to riser power conductors of the riser cable; and wherein respective outputs of one or more of the e-fuses are connected to auxiliary power conductors of the auxiliary cable.

8. The auxiliary power cable assembly of claim 1, wherein the power connector is a PICPWR connector.

9. The auxiliary power cable assembly of claim 1, wherein the input connector assembly comprises a housing; and wherein the riser cable and the auxiliary cable extend from the housing perpendicularly to a mating axis of the power connector.

10. A computing system comprising:
a primary system board comprising a processor, an expansion slot, and a power output connector;
a riser card comprising a riser power input connector, an edge connector connected to the expansion slot, and a riser card slot;
an expansion card comprising an auxiliary power input connector, and an edge connector connected to the riser card slot; and
an auxiliary power cable assembly, comprising:
an input connector assembly comprising a paddle board and a power connector mounted to the paddle board, the power connector connected to the power output connector;
a riser output connector connected to the riser power input connector;
a riser cable connected to the paddle board to the riser output connector;
an auxiliary output connector connected to the auxiliary power input connector; and
an auxiliary cable connected to the paddle board to the auxiliary output connector;
wherein the paddle board comprises e-fuses configured to control electrical power supplied from the power connector to the riser output connector and from the power connector to the auxiliary output connector.

11. The computing system of claim 10, comprising:
riser power pathways configured to convey power from the power connector to the riser card via the riser cable and riser output connector;
riser sideband pathways configured to convey sideband signals between the power connector and the riser card via the riser cable and riser output connector;
auxiliary power pathways configured to convey power from the power connector to the expansion card via the auxiliary cable and auxiliary output connector; and
auxiliary sideband pathways configured to convey sideband signals between the power connector and the expansion card via the auxiliary cable and auxiliary output connector.

12. The computing system of claim 11, wherein the power connector comprises power contacts and sideband contacts; wherein some of the power contacts correspond to the riser power pathways and some of the power contacts correspond to the auxiliary power pathways; and wherein some of the sideband contacts correspond to the riser sideband pathways and some of the sideband contacts correspond to the sideband power pathways.

13. The computing system of claim 11, wherein the power connector comprises twelve power contacts and six sideband contacts; wherein two of the power contacts correspond to the riser power pathways and ten of the power contacts correspond to the auxiliary power pathways; and wherein four of the sideband contacts corresponding to the riser sideband pathways and two of the sideband contacts correspond to the sideband power pathways.

14. The computing system of claim 13, wherein the paddle board comprises six of the e-fuses, with one of the e-fuses being configured to control power through the first power pathways and five of the e-fuses being configured to control power through the auxiliary power pathways.

15. The computing system of claim 10, wherein the power connector comprises a first subset of power contacts configured to carry a supply potential and a second subset of power contacts configured to carry a ground potential; wherein the paddle board comprises one of the e-fuses for each power contact in the first subset of power contacts, with each power contact in the first subset of power contacts being electrically connected to an input of the e-fuse.

16. The computing system of claim 15, wherein respective output of one or more of the e-fuses are connected to riser power conductors of the riser cable; and wherein respective outputs of one or more of the e-fuses are connected to auxiliary power conductors of the auxiliary cable.

17. The computing system of claim 10, wherein the power connector is a PICPWR plug-type connector and the power output connector is a PICPWR socket-type connector.

18. The computing system of claim 17, wherein the input connector assembly comprises a housing; and wherein the riser cable and the auxiliary cable extend from the housing perpendicularly to a mating axis of the power connector.

19. The computing system of claim 10, wherein the riser card omits any power gating logic.

20. A method, comprising:

supplying electrical power and sideband signals from a power output connector of a primary system board of a computing system to a power connector of an auxiliary power cable assembly coupled to the power output connector;

conveying the electrical power and sideband signals to a paddle board of the auxiliary power cable assembly to which the power connector is mounted;

conveying some of the electrical power and some of the sideband signals from the paddle board to a riser card via a riser cable and riser output connector;

conveying some of the electrical power and some of the sideband signals from the paddle board to an expansion card coupled to the riser card via an auxiliary cable and auxiliary output connector; and power gating, by e-fuses mounted to the paddle board, the electrical power supplied to the riser card via the riser cable and the electrical power supplied to the expansion card via the auxiliary cable.

* * * * *